US011910175B2

(12) United States Patent
Chen et al.

(10) Patent No.: US 11,910,175 B2
(45) Date of Patent: Feb. 20, 2024

(54) SPEAKER

(71) Applicant: AAC Microtech (Changzhou) Co., Ltd., Changzhou (CN)

(72) Inventors: Xingchi Chen, Shenzhen (CN); Weimin Chen, Shenzhen (CN); Yao Hui, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 0 days.

(21) Appl. No.: 17/880,697

(22) Filed: Aug. 4, 2022

(65) Prior Publication Data

US 2023/0209270 A1 Jun. 29, 2023

(30) Foreign Application Priority Data

Dec. 29, 2021 (CN) ......................... 202123381356.9

(51) Int. Cl.

*H04R 7/18* (2006.01)
*H04R 7/12* (2006.01)
*H04R 9/02* (2006.01)

(52) U.S. Cl.

CPC ............... *H04R 7/18* (2013.01); *H04R 7/127* (2013.01); *H04R 9/025* (2013.01)

(58) Field of Classification Search

CPC ........... H04R 7/127; H04R 7/18; H04R 9/025
See application file for complete search history.

(56) References Cited

U.S. PATENT DOCUMENTS

2018/0367904 A1* 12/2018 Gu ........................... H04R 9/06
2018/0367907 A1* 12/2018 Wu ........................ H04R 7/127

* cited by examiner

*Primary Examiner* — Sunita Joshi
(74) *Attorney, Agent, or Firm* — W&G Law Group

(57) ABSTRACT

The present invention provides a speaker, including a frame with a containment space, a magnetic circuit system and a vibration system. The vibration system includes a vibration diaphragm. The diaphragm includes a dome and a suspension. The suspension includes a first fixed part, a suspension part, and a second fixed part extending away from the first fixed part from the outer edge of suspension part. The suspension part includes two short axle parts, two long axle parts, and a corner part connecting adjacent short axle parts and long axle parts. The vibration diaphragm includes a reinforcement assembly connected to the corner part and connected to the first fixed part and the second fixed part at both ends. By virtue of reinforcement assembly at the corner part of the suspension, the speaker can obtain better acoustic performance.

9 Claims, 8 Drawing Sheets

SPEAKER

FIELD OF THE PRESENT DISCLOSURE

The present invention relates to the field of electroacoustic transducers, especially to a speaker.

DESCRIPTION OF RELATED ART

Due to the inevitable assembly deviation or uneven material process of the micro speaker during production, it will cause the speaker to sway when it vibrates. Makes the entire dome surface in a tilted state, and will cause abnormalities such as wiping ring to occur. In severe cases, the entire speaker unit will be destroyed, making the speaker unable to obtain better acoustic performance.

SUMMARY OF THE PRESENT INVENTION

The main purpose of the present invention is to provide a speaker with improved acoustic performance.

Accordingly, the present invention provides a speaker, comprising: a frame with a containment space; a magnetic circuit system in the containment space; and a vibration system in the containment space, including a vibration diaphragm located on one side of the frame. The vibration diaphragm includes a dome in a middle portion of the vibration diaphragm, a suspension around an outer edge of dome, including a first fixed part connected to the outer edge of the dome, a suspension part extending outwardly from an end of the first fixed part away from the dome, and a second fixed part extending away from the first fixed part from the outer edge of the suspension part.

The suspension part includes two short axle parts arranged opposite to each other, two long axle parts, and a corner part connecting the adjacent short axle parts and the long axle parts. The vibration diaphragm further includes a reinforcement assembly connected to the corner part and two ends respectively connected to the first fixed part and the second fixed part.

In addition, the reinforcement assembly includes a support part protruding from one side of the corner part and extending from the first fixed part toward the second fixed part, and a reinforcement component connected to the support part, one end of the reinforcement component is connected to the first fixed part and the other end is connected to the second fixed part.

In addition, the reinforcement component is connected to a tail end of the support part away from the corner part.

In addition, the reinforcement component includes a first connector connected with the first fixed part, a second connector connected with the second fixed part, and a reinforcing rib extending from the first connector to the second connector and connected with the support part.

In addition, the speaker as described above includes a groove in a connection between the first fixed part and the first connector, and/or at a connection between the second fixed part and the second connector; wherein the first connector is at least partially adhered to the corresponding groove, and/or the second connector is at least partially adhered to the corresponding groove.

In addition, the first connector is integrally formed with the first fixed part, and/or the second connector is integrally formed with the second fixed part.

In addition, the reinforcement assembly includes at least two support parts, and each of the support parts is arranged at intervals along the extension direction of the suspension part; the reinforcement component includes at least two of the reinforcing ribs; the reinforcing ribs are arranged at intervals along the extension direction of the suspension part; the two ends of each reinforcing rib are respectively connected with the first connector and the second connector, and each reinforcing rib is connected with the corresponding support part.

In addition, the support part includes an installation part on a side connected to the reinforcing rib, and the installation part covers at least part of the reinforcing rib.

In addition, the installation part includes at least two sub-installation parts, and the sub-installation parts are connected to the same reinforcing rib at intervals.

In addition, the reinforcement component comprises fiber material.

BRIEF DESCRIPTION OF THE DRAWINGS

Many aspects of the exemplary embodiment can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain the disclosure, not intended to limit the disclosure.

Figure 1:
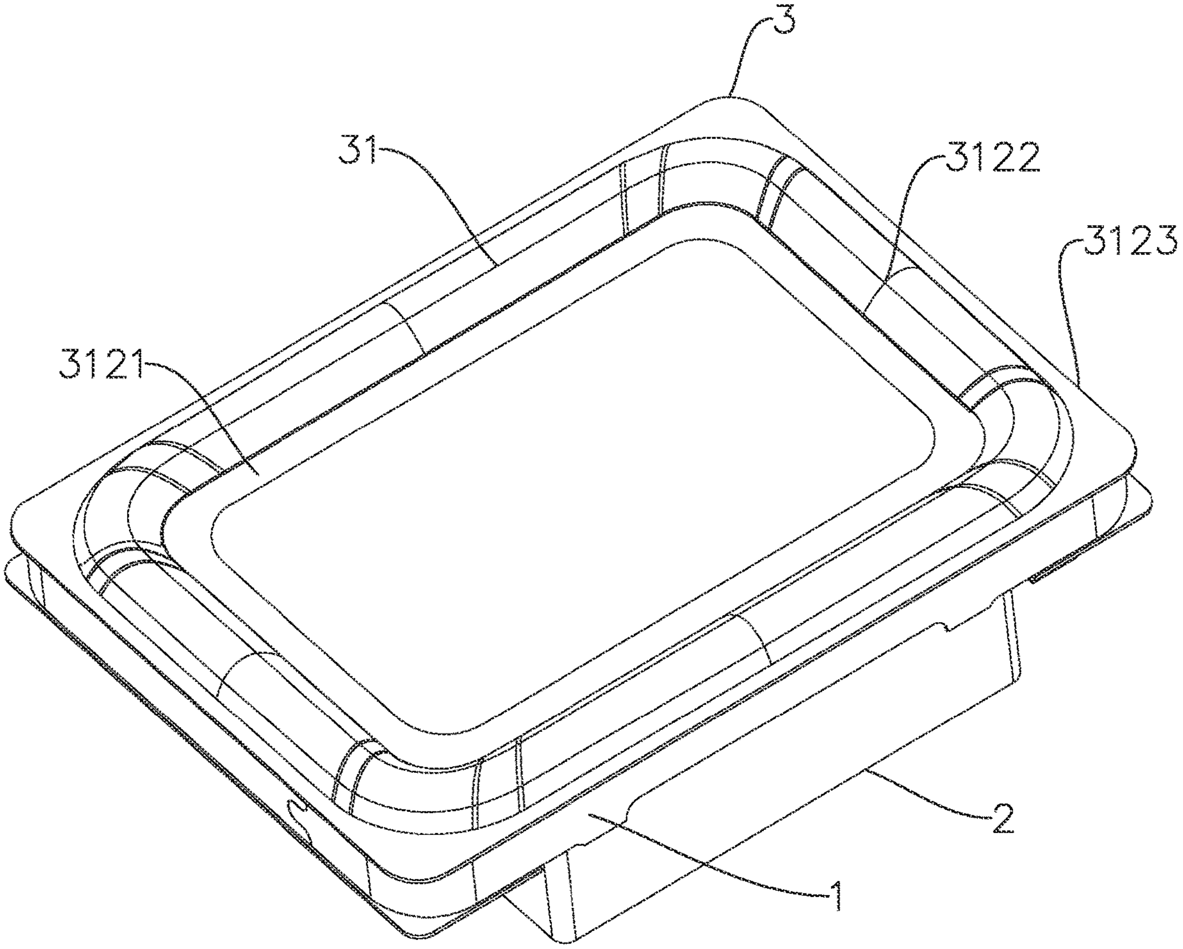
FIG. 1 is an isometric view of an exemplary speaker of the present invention.
Figure 2:
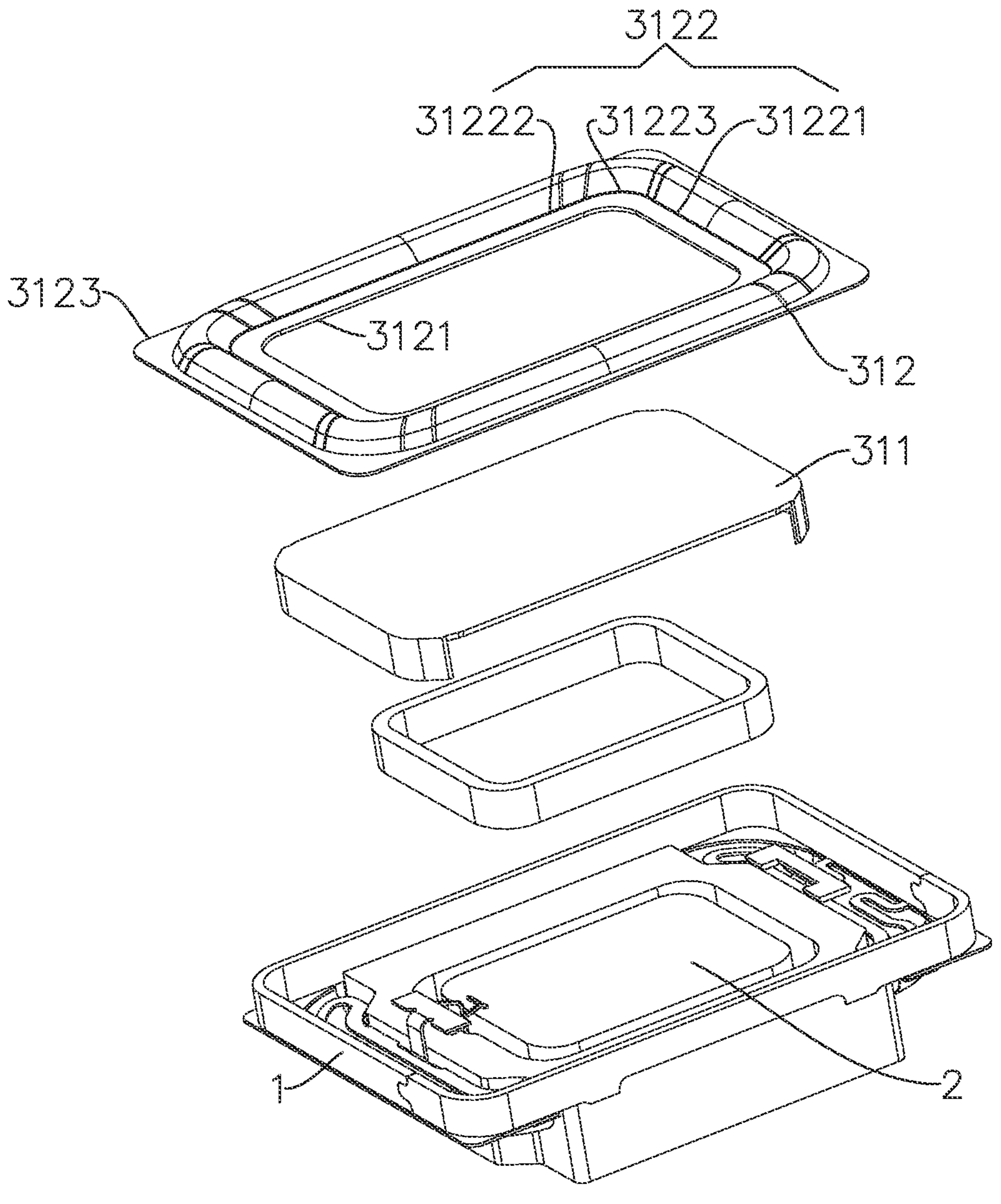
FIG. 2 is a partially exploded view of the speaker in FIG. 1.
Figure 3:
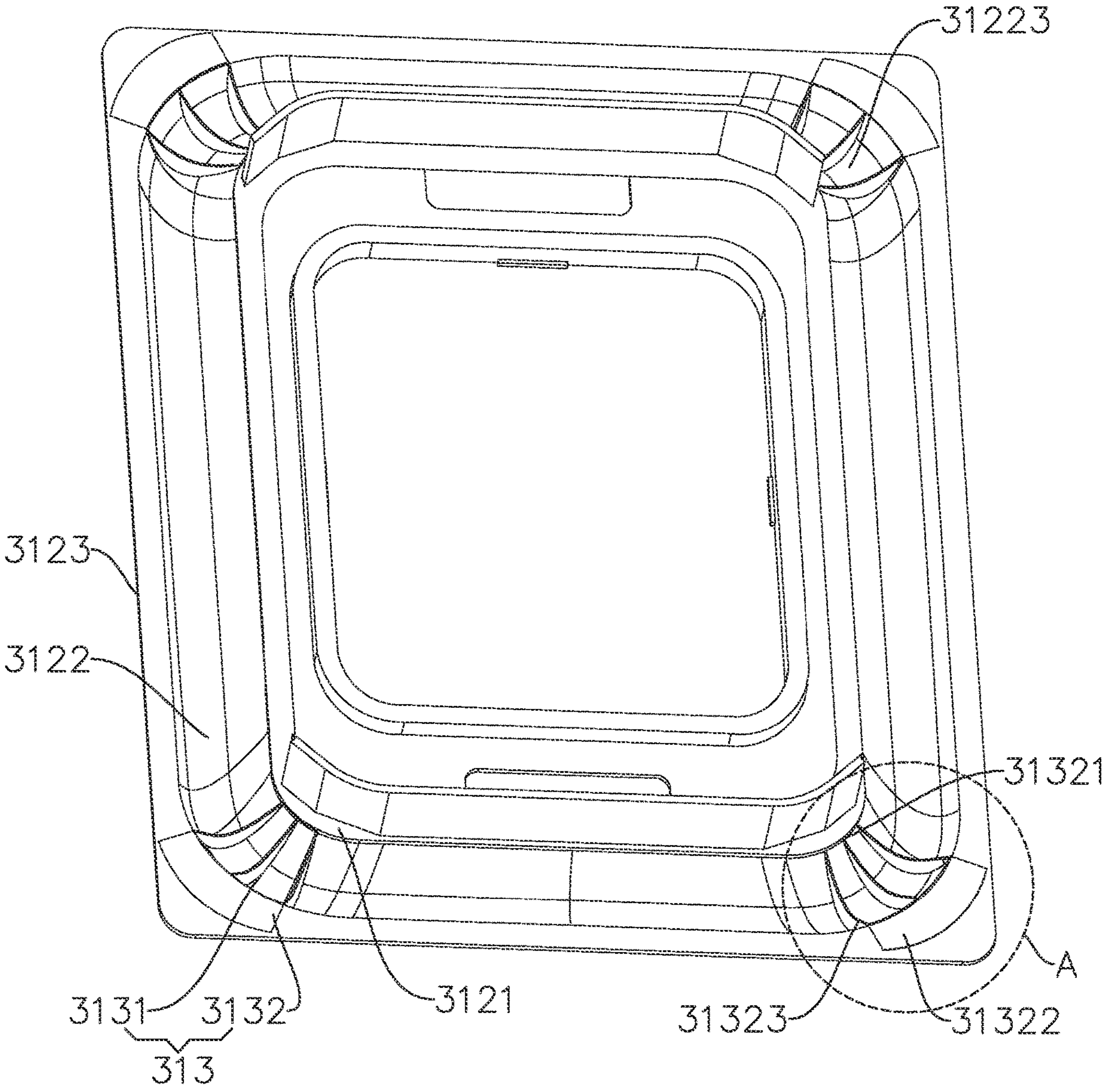
FIG. 3 is an isometric view of a vibration diaphragm of the speaker.

Please refer to FIGS. 1-3, the present invention provides a speaker, including a frame 1 with a containment space, and a magnetic circuit system 2 and a vibration system 3 disposed in the containment space. The vibration system 3 includes a vibration diaphragm 31 arranged on one side of the frame 1, and the vibration diaphragm 31 includes a dome 311 in the middle and a suspension 312 around the outer side of the dome 311. The suspension 312 includes a first fixed part 3121 connected to the outer edge of the dome 311, a suspension part 3122 extending outward from an end of the first fixed part 3121 away from the dome 311, and a second fixed part 3123 extending from the outer edge of the suspension part 3122 in a direction away from the first fixed part 3121. The suspension part 3122 includes two short axle parts 31221 disposed opposite to each other, two long axle parts 31222 disposed opposite to each other, and a corner part 31223 connecting the adjacent short axle parts 31221 and long axle parts 31222. The vibration diaphragm 31 also includes a reinforcement assembly 313 connected to the corner part 31223 and connected to the first fixed part 3121 and the second fixed part 3123 respectively at both ends.

In the present invention, the suspension 312 is runway type, the suspension part 3122 is bent away from the frame 1, and reinforcement assembly 313 is added at the corner part 31223 of the suspension 312 to connect the first fixed part 3121, corner part 31223 and second fixed part 3123, which improves the strength of the suspension 312. When the vibration diaphragm 31 vibrates, it can provide a better balance of the vibration system 3, suppress the rocking motion to the greatest extent, and make the speaker obtain better acoustic performance.

Further, referring to FIGS. 2 and 3, the reinforcement assembly 313 includes a support part 3131 protruding from one side of the corner part 31223 and extending in the direction from the first fixed part 3121 toward the second fixed part 3123, and a reinforcement component 3132 connected to the support part 3131. One end of reinforcement component 3132 is connected to first fixed part 3121 and the other end is connected to second fixed part 3123. The reinforcement component 3132 is connected to the tail end of the support part 3131 away from the corner part 31223. The reinforcement component 3132 includes a first connector 31321 connected to the first fixed part 3121, a second connector 31322 connected to the second fixed part 3123, and a reinforcing rib 31323 extending from the first connector 31321 to the second connector 31322 and connected to the support part 3131.

Figure 5:
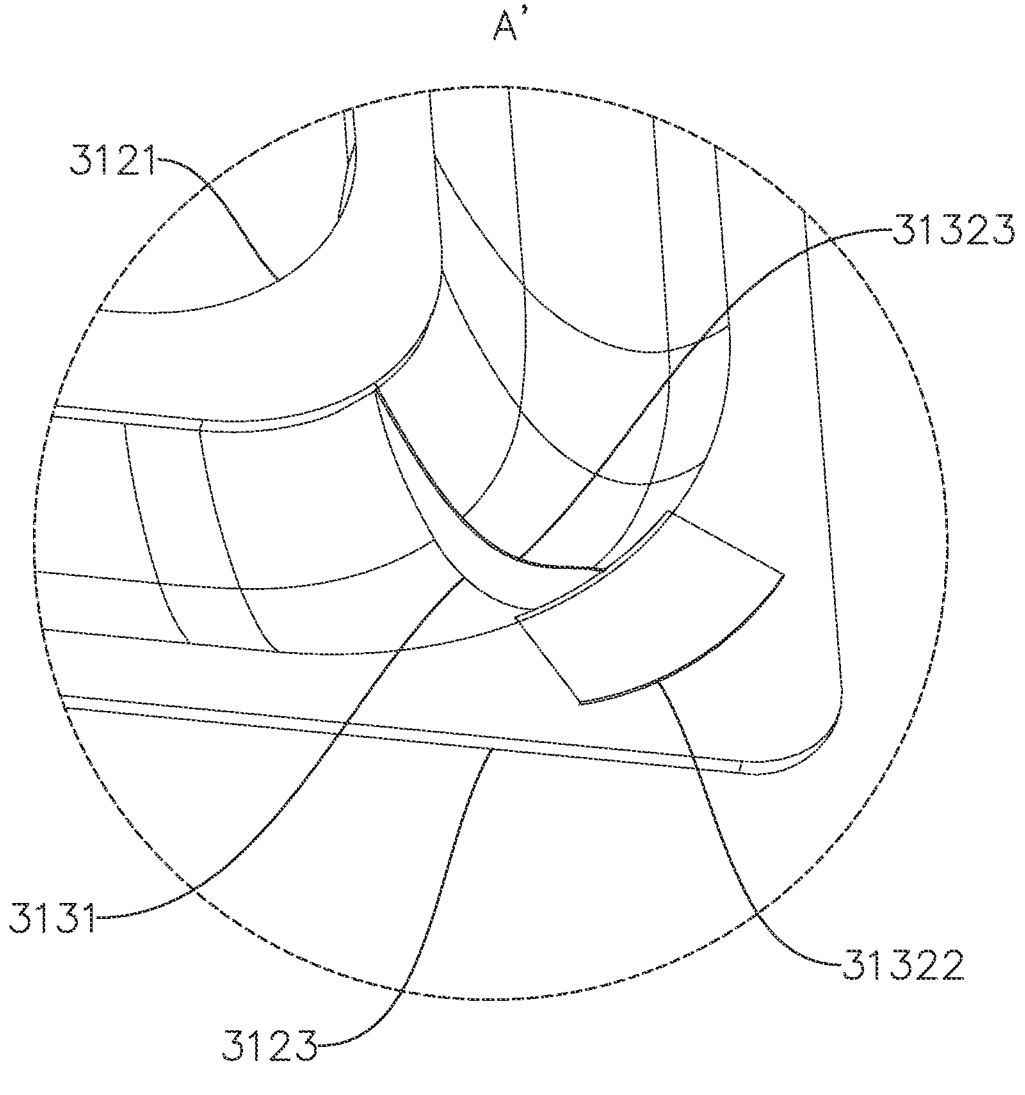
FIG. 5 illustrates the vibration diaphragm at Circled Part A in FIG. 3, in accordance with a second implementation.

In this embodiment, the suspension 312 is arranged with a supporting structure (i.e., the support part 3131) protruding toward the direction close to the frame 1, and the two ends of the support part 3131 are respectively connected with the first fixed part 3121 and the second fixed part 3123, which play a role in strengthening the structural strength of the suspension 312. Furthermore, a reinforcing rib 31323 is assembled at the R corner of the suspension 312 of runway type (i.e., the corner part 31223), and the reinforcing rib 31323 of the reinforcement component 3132 is tightly connected with the protruding end of the support part 3131 (i.e., the protruding side of the support part 3131), which further strengthens the effect of the structural strength of the suspension 312. That is to say, this embodiment plays the role of double strengthening the strength of the suspension part 3122 by using the support part 3131 and the reinforcement component 3132 set on the four corner parts 31223, which can simultaneously balance the vibration system 3, suppress the swing, and reduce the distortion to obtain better acoustic performance. Wherein, the reinforcing ribs 31323, the support part 3131 and the suspension part 3122 have the same or different bending degrees, which can better adapt to the structure of the suspension part 3122 and play a better strengthening role. In this embodiment, the number of reinforcing ribs 31323 is one (as shown in FIG. 5). Of course, in other embodiments, multiple reinforcing ribs 31323 can be used as needed.

Further, a groove is opened at the connection between the first fixed part 3121 and the first connector 31321, and/or a groove is opened at the connection between the second fixed part 3123 and the second connector 31322. The first connector 31321 is at least partially bonded within the corresponding groove, and/or the second connector 31322 is at least partially bonded within the corresponding groove.

In this embodiment, the shapes of the first connector 31321 and the second connector 31322 are sheet-like. Of course, in some other embodiments, the first connector 31321 and the second connector 31322 can be set to block, column, or spherical shapes as needed. A groove matching the shape of the first connector 31321 is opened at the first fixed part 3121, the first connector 31321 is embedded in the groove, and in order to strengthen the connection between the first connector 31321 and the groove, the first connector 31321 and the groove are fixed by bonding. The first connector 31321 is at least partially embedded in the groove and partially exposed outside the groove. Of course, the first connector 31321 can also be completely embedded in the groove. Furthermore, as required, the first connector 31321 and groove can also be interference fitting. The first connector 31321 and groove can be bonded by glue, glue, double-sided tape, etc. Of course, in other embodiment, it can also be fastened by buckle or other means. Of course, in some other embodiments, a groove can also be opened at the connection between the second fixed part 3123 and the second connector 31322, and the second connector 31322 is at least partially bonded in the corresponding groove. Alternatively, grooves are opened at the connection between the first fixed part 3121 and the first connector 31321 and at the connection between the second fixed part 3123 and the second connector 31322. The first connector 31321 and the second connector 31322 are at least partially bonded within the corresponding grooves.

Figure 4:
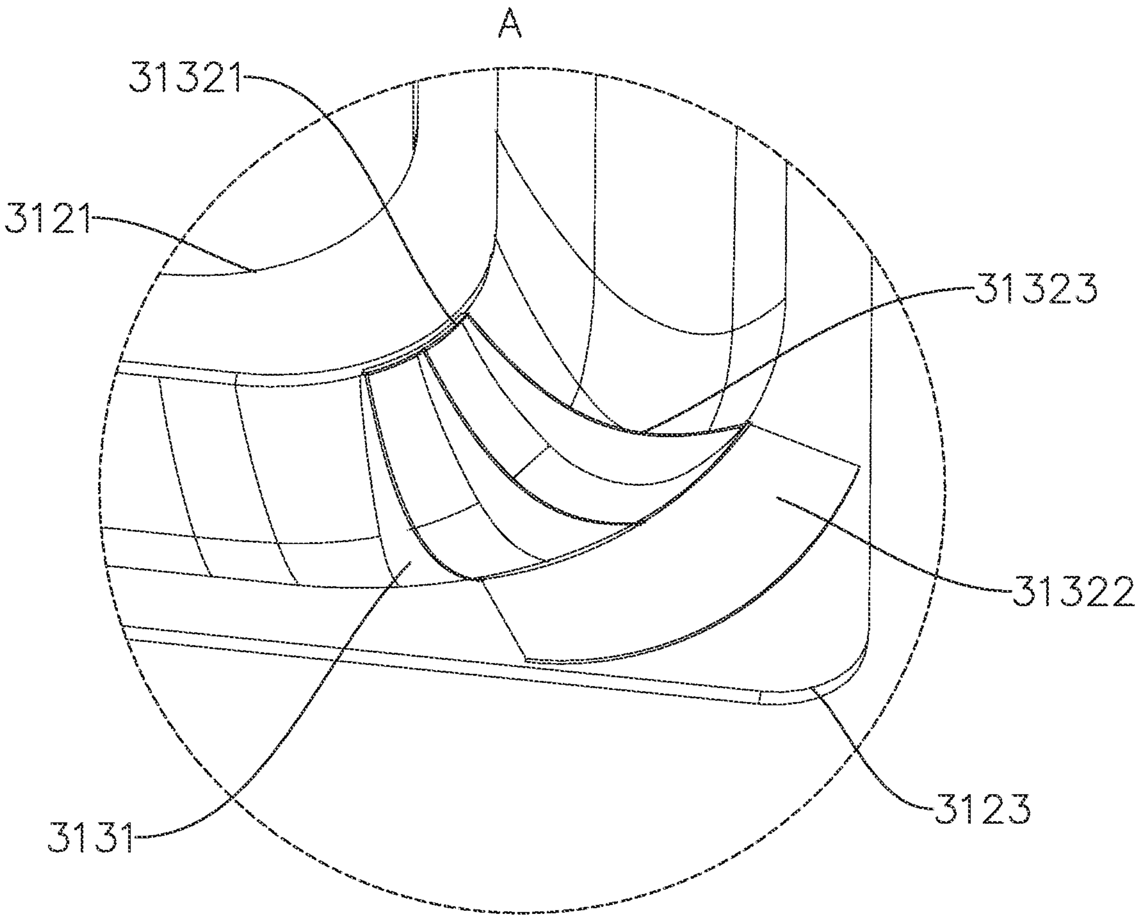
FIG. 4 illustrates the vibration diaphragm at Circled Part A in FIG. 3, in accordance with a first implementation.

Further, please refer to FIG. 3 and FIG. 4, the first connector 31321 is integrally formed in the first fixed part 3121, and/or the second connector 31322 is integrally formed in the second fixed part 3123.

In this embodiment, the first fixed part 3121 and the first connector 31321 can also be integrally formed, or the first fixed part 3121 can have an accommodation cavity inside. Insert the first connector 31321 into the first fixed part 3121, and then fix it, so that an integrated structure is formed between the first connector 31321 and the first fixed part 3121. Of course, in some other embodiments, the second connector 31322 is integrally formed in the second fixed part 3123. Alternatively, first fixed part 3121 and first connector 31321, second fixed part 3123 and second connector 31322 are integrated structures.

Further, please refer to FIG. 3 and FIG. 4, the reinforcement assembly 313 includes at least two support parts 3131. Each support part 3131 is arranged at intervals along the extension direction of the suspension part 3122. The reinforcement component 3132 includes at least two reinforcement ribs 31323. The reinforcing ribs 31323 are arranged at intervals along the extension direction of the suspension part 3122. And the two ends of each reinforcing rib 31323 are respectively connected with the first connector 31321 and the second connector 31322, and each reinforcing rib 31323 is connected with the corresponding support part 3131.

In this embodiment, multiple support parts 3131 are set on the suspension part 3122. Each support part 3131 is set at intervals with the extension direction of the suspension part 3122. The reinforcing ribs 31323 are arranged at intervals along the extension direction of the suspension part 3122. And the reinforcing ribs 31323 are connected with the corresponding support parts 3131, and all the reinforcing ribs 31323 are connected in the same first connector 31321 and the same second connector 31322. Of course, in other embodiments, the reinforcement component 3132 may also have multiple first connectors 31321 and multiple second connectors 31322 as required. At this time, each reinforcing rib 31323 is connected with the corresponding first connector 31321 and the corresponding second connector 31322 respectively. The number of reinforcing ribs 31323 can be 2, 3, 4 or more, and the number of the reinforcing ribs 31323 can be set as required.

Figure 6:
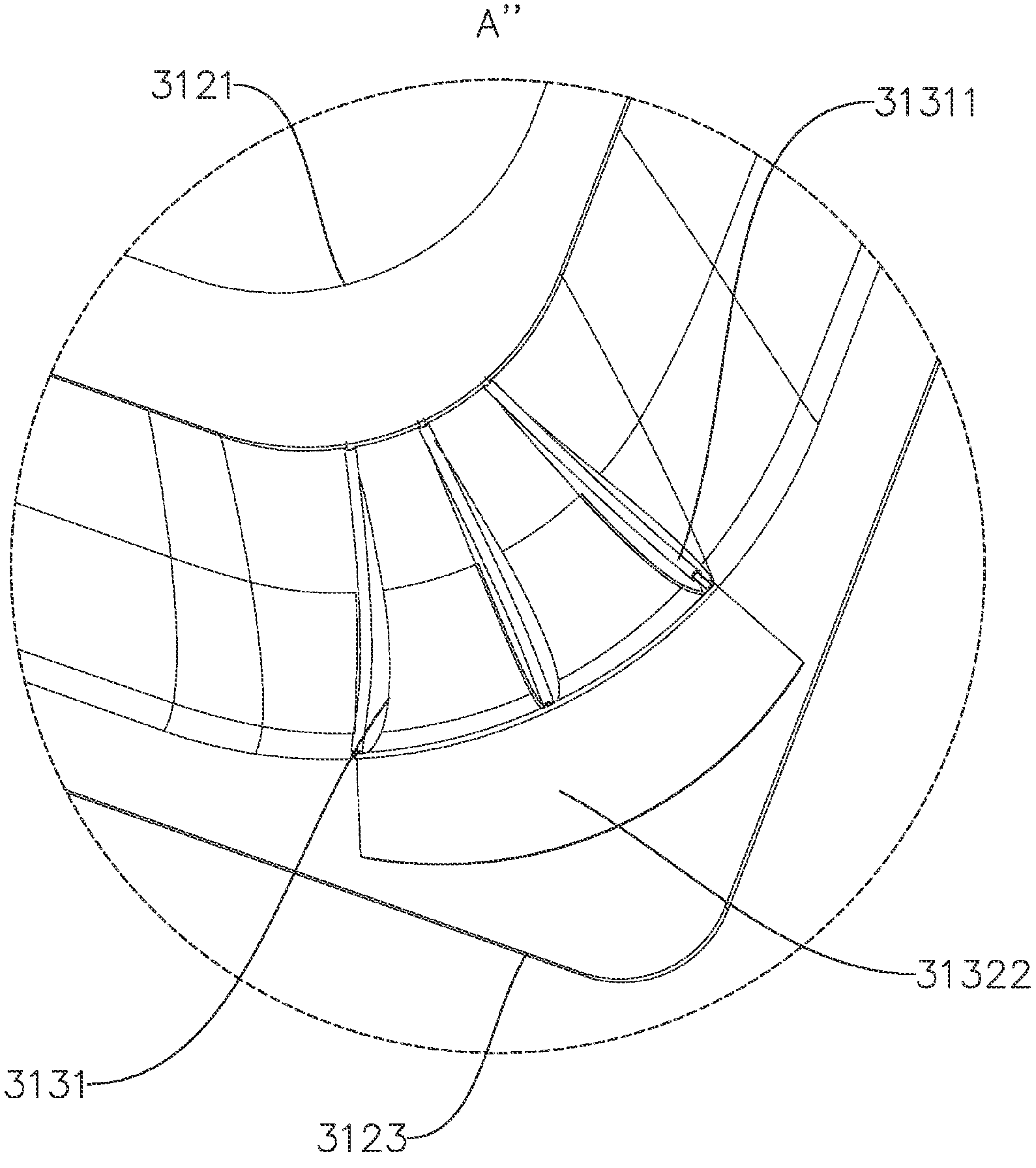
FIG. 6 illustrates the vibration diaphragm at Circled Part A in FIG. 3, in accordance with a third implementation.
Figure 7:
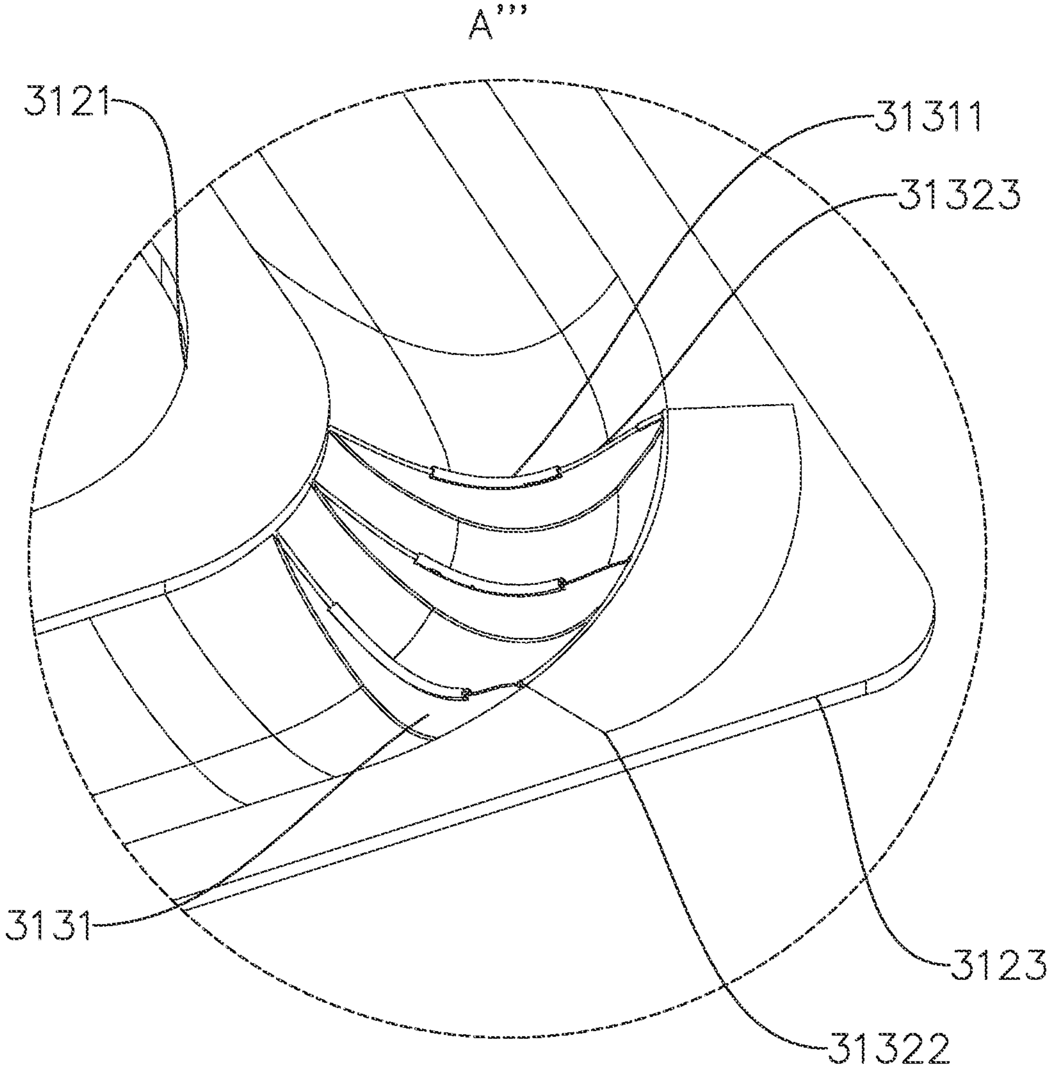
FIG. 7 illustrates the vibration diaphragm at Circled Part A in FIG. 3, in accordance with a fourth implementation.

Further, please refer to FIGS. 3, 6-7, the support part 3131 is arranged with an installation part 31311 on the side connected with the reinforcing rib 31323, and the installation part 31311 covers at least part of the reinforcing rib 31323.

In this embodiment, the support part 3131 is arranged with an installation part 31311 on the connection side with the reinforcement rib 31323, and the installation part 31311 is a columnar structure. In order to ensure the reliability of the connection between the reinforcement rib 31323 and the vibration diaphragm 31, the installation part 31311 can be designed as a fully wrapped shape or half wrapped shape. When the installation part 31311 is a fully wrapped shape, the installation part 31311 is a hollow column structure, and the reinforcing rib 31323 is filled in the hollow column structure of the installation part 31311, that is, the installation part 31311 is wrapped around the entire rib 31323. When the installation part 31311 is half wrapped shape, the installation part 31311 is a hollow column structure, and there is an opening on a side surface of the installation part 31311.

The reinforcing rib 31323 is filled in the hollow column structure of the installation part 31311 by opening, that is, the installation part 31311 only wraps part of the reinforcing rib 31323, and part of the reinforcing rib 31323 is exposed outside the installation part 31311. By wrapping part or all of the reinforcing rib 31323 with the support part 3131, not only the reliability of the connection between the reinforcing rib 31323 and the vibration diaphragm can be ensured, but also the function of protecting the reinforcing rib 31323 can be achieved to a certain extent.

It should be noted that, whether it is the installation part 31311 of fully wrapping or half wrapped shape, the installation part 31311 can extend from the first connector 31321 to the second connector 31322, or can be set at a part of the reinforcing rib 31323. That is, the installation part 31311 can be arranged in the whole or in part along the length direction of the reinforcing rib 31323.

Figure 8:
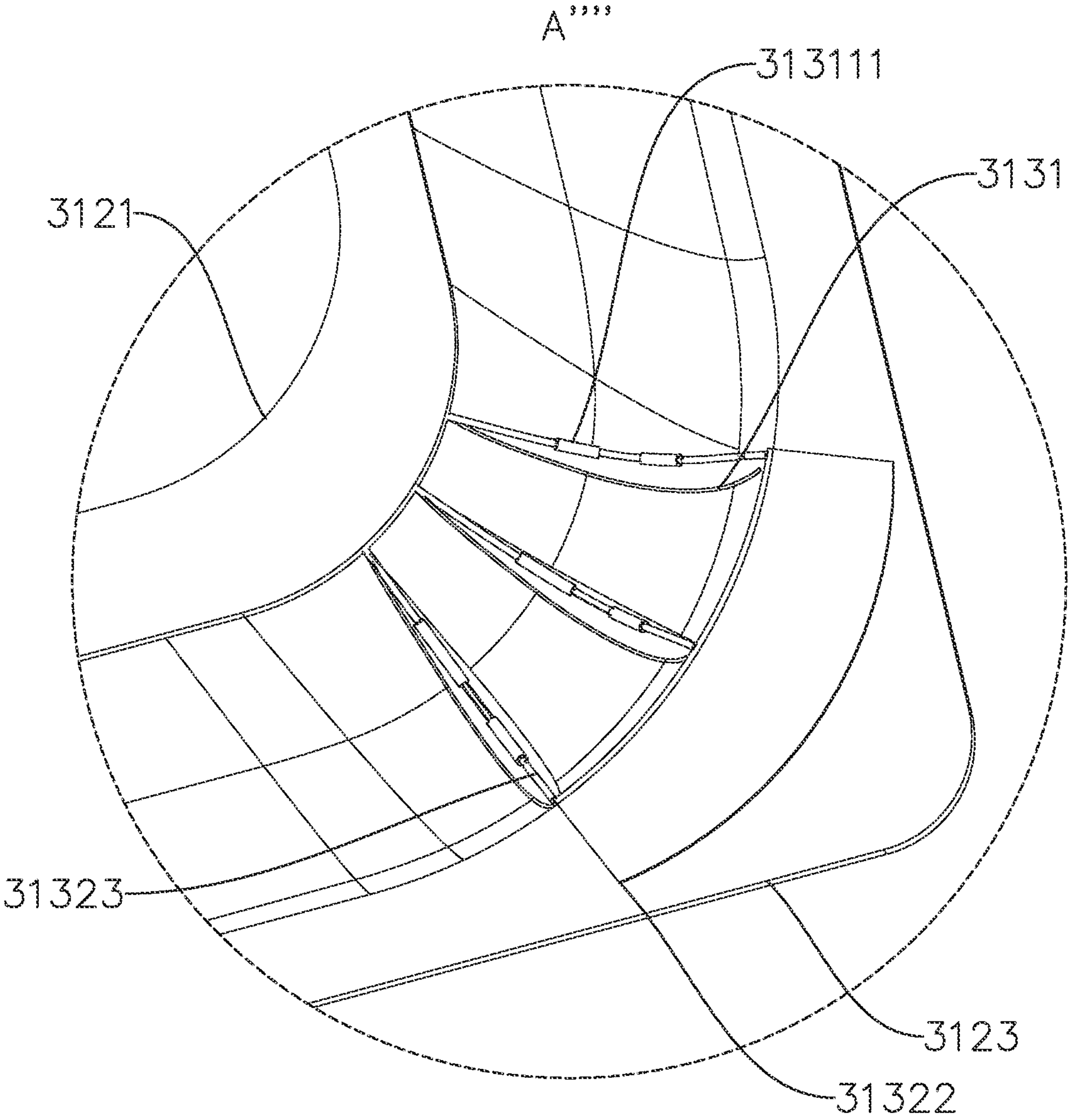
FIG. 8 illustrates the vibration diaphragm at Circled Part A in FIG. 3, in accordance with a fifth implementation.

Further, please refer to FIG. 3 and FIG. 8, the installation part 31311 includes at least two sub-installation parts 313111, and the sub-installation parts 313111 are connected to the same reinforcing rib 31323 at intervals.

In this embodiment, installation part 31311 has multiple sub-installation part 313111, a plurality of sub-reinforcing ribs 31323 are connected to the same reinforcing rib 31323 at intervals, which can not only ensure the reliability of the connection between the reinforcing rib 31323 and the vibration diaphragm, but also save materials and reduce costs. Of course, the connection between the sub-installation part 313111 and the part corresponding to the reinforcing rib 31323 is also the wrapping way of fully wrapping or half wrapping; multiple sub-installation parts 313111 can be set on the same support part 3131, such as 2, 3, 4 or more Multiple, the number of sub-installation part 313111 can be set as needed.

Further, the reinforcement component 3132 adopts fiber material.

In this embodiment, the amplitude of the fiber material is slightly higher than the maximum amplitude of the speaker's work, which can provide a better balance of the vibration system 3 when the vibration diaphragm 31 vibrates, suppress the rocking motion to the greatest extent, and enable the speaker to obtain better acoustic performance.

To sum up, the speaker provided by the present invention, using reinforcement assembly, can provide a better balance of the vibration system when the vibration diaphragm vibrates, suppress the rocking motion to the greatest extent, and make the speaker obtain better acoustic performance.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A speaker, comprising:

a frame with a containment space;

a magnetic circuit system in the containment space;

a vibration system in the containment space, including a vibration diaphragm located on one side of the frame; wherein the vibration diaphragm includes:

a dome in a middle portion of the vibration diaphragm;

a suspension around an outer edge of dome, including a first fixed part connected to the outer edge of the dome, a suspension part extending outwardly from an end of the first fixed part away from the dome, and a second fixed part extending away from the first fixed part from the outer edge of the suspension part; and wherein the suspension part includes two short axle parts arranged opposite to each other, two long axle parts, and a corner part connecting the adjacent short axle parts and the long axle parts; the vibration diaphragm further includes a reinforcement assembly connected to the corner part and two ends respectively connected to the first fixed part and the second fixed part;

wherein the reinforcement assembly includes a support part protruding from one side of the corner part and extending from the first fixed part toward the second fixed part, and a reinforcement component connected to the support part, one end of the reinforcement component is connected to the first fixed part and the other end is connected to the second fixed part.

2. The speaker as described in claim 1, wherein the reinforcement component is connected to a tail end of the support part away from the corner part.

3. The speaker as described in claim 1, wherein the reinforcement component includes a first connector connected with the first fixed part, a second connector connected with the second fixed part, and a reinforcing rib extending from the first connector to the second connector and connected with the support part.

4. The speaker as described in claim 3 including a groove in a connection between the first fixed part and the first connector, and/or at a connection between the second fixed part and the second connector; wherein the first connector is at least partially adhered to the corresponding groove, and/or the second connector is at least partially adhered to the corresponding groove.

5. The speaker as described in claim 3, wherein the first connector is integrally formed with the first fixed part, and/or the second connector is integrally formed with the second fixed part.

6. The speaker as described in claim 3, wherein the reinforcement assembly includes at least two support parts, and each of the support parts is arranged at intervals along the extension direction of the suspension part; the reinforcement component includes at least two of the reinforcing ribs; the reinforcing ribs are arranged at intervals along the extension direction of the suspension part; the two ends of each reinforcing rib are respectively connected with the first connector and the second connector, and each reinforcing rib is connected with the corresponding support part.

7. The speaker as described in claim 3, wherein the support part includes an installation part on a side connected to the reinforcing rib, and the installation part covers at least part of the reinforcing rib.

8. The speaker as described in claim 7, wherein the installation part includes at least two sub-installation parts, and the sub-installation parts are connected to the same reinforcing rib at intervals.

9. The speaker as described in claim 1, wherein the reinforcement component comprises fiber material.

* * * * *